United States Patent [19]
Wong et al.

[11] Patent Number: 6,141,187
[45] Date of Patent: Oct. 31, 2000

[54] SUSPENSION WITH RETICULATED SPRING PORTION AND PATTERN ETCHED BEAM PORTION

[75] Inventors: Chu Wong, Huntington Park; Amanullah Khan, Temecula, both of Calif.

[73] Assignee: Manecomp Corp., Temecula, Calif.

[21] Appl. No.: 09/040,909

[22] Filed: Mar. 18, 1998

Related U.S. Application Data

[60] Provisional application No. 60/075,950, Feb. 25, 1998.

[51] Int. Cl.[7] ........................................... G11B 5/48
[52] U.S. Cl. ..................................... 360/244.8; 360/244.9
[58] Field of Search ................................. 360/104, 244.8, 360/244.9

[56] References Cited

U.S. PATENT DOCUMENTS

| | | | |
|---|---|---|---|
| 5,126,904 | 6/1992 | Sakurai | 360/104 |
| 5,313,353 | 5/1994 | Kohso et al. | 360/104 |
| 5,734,525 | 3/1998 | Girard . | |
| 5,757,586 | 5/1998 | Budde | 360/104 |
| 5,808,836 | 9/1998 | Frater et al. | 360/104 |
| 5,812,342 | 9/1998 | Khan et al. | 360/104 |
| 5,812,344 | 9/1998 | Balakrishnan | 360/104 |
| 5,844,752 | 12/1998 | Bozorgi et al. | 360/104 |
| 5,870,252 | 2/1999 | Hanrahan | 360/104 |
| 5,995,335 | 11/1999 | Jurgenson et al. . | |

*Primary Examiner*—Craig A. Renner
*Attorney, Agent, or Firm*—Louis J. Bachand

[57] ABSTRACT

Disk drive suspension having a base portion, a spring portion and elongated beam portion mounting a flexure. The spring portion is reticulated throughout substantially its entire extent in a manner to decrease the vertical stiffness of the suspension while increasing its sway mode resonance. The beam portion is stiffened with a series of shallow etchings or through apertures located between ribs emanating from the center of the beam portion.

16 Claims, 4 Drawing Sheets

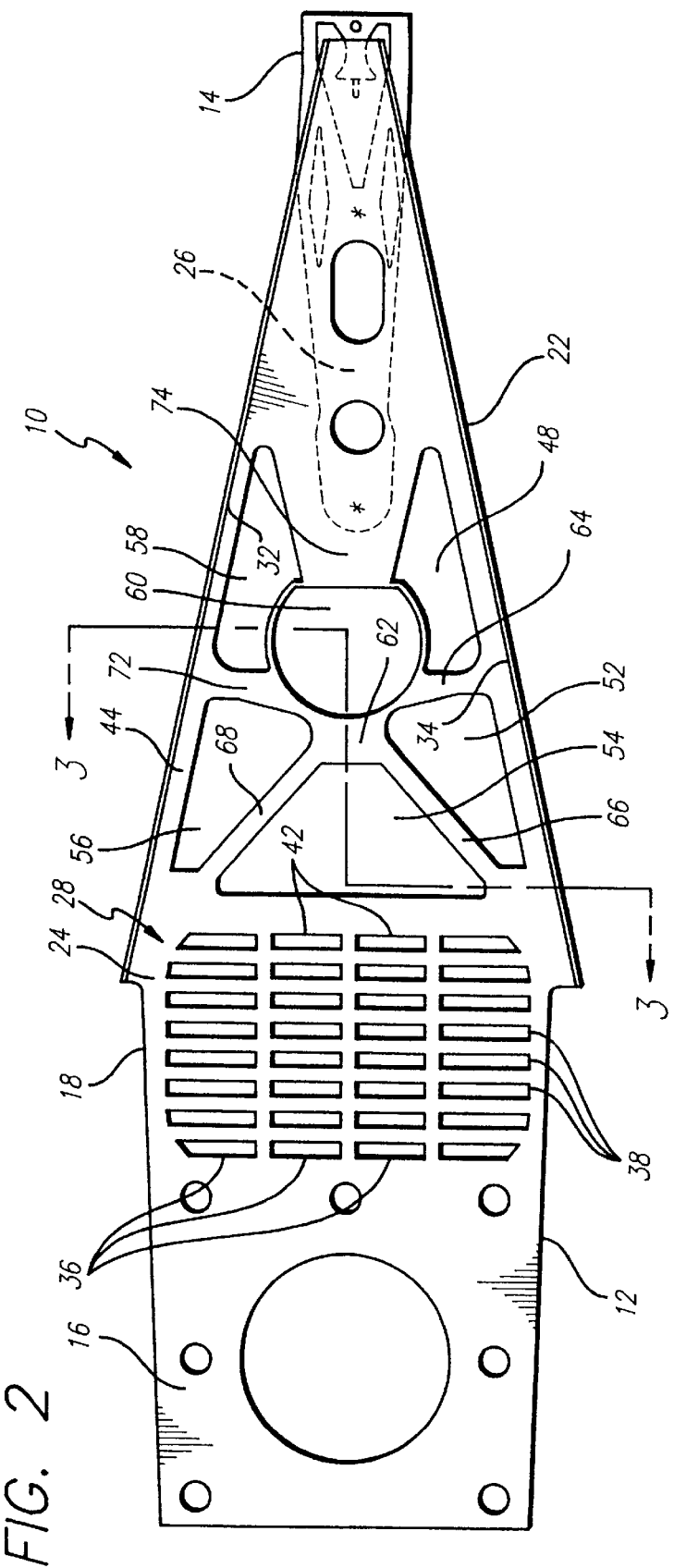

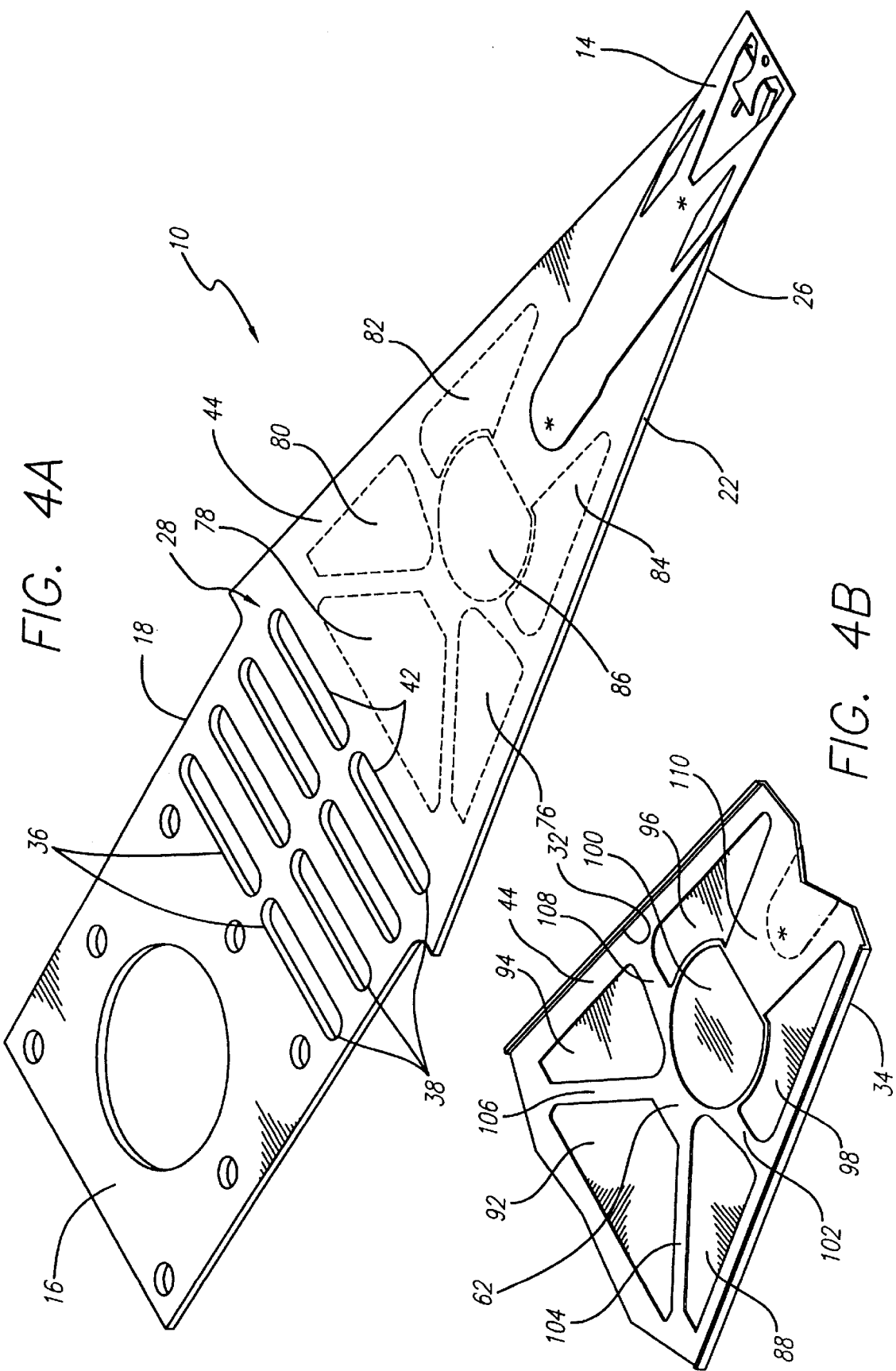

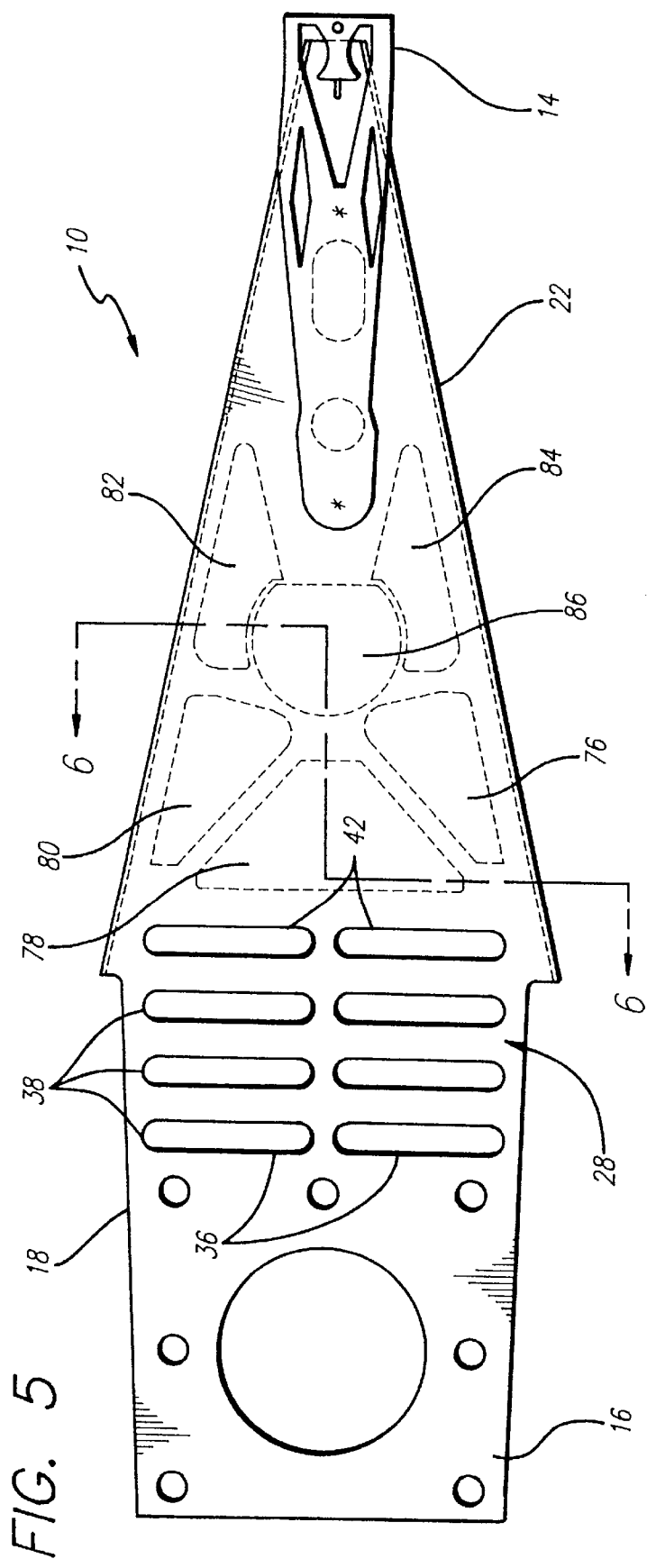
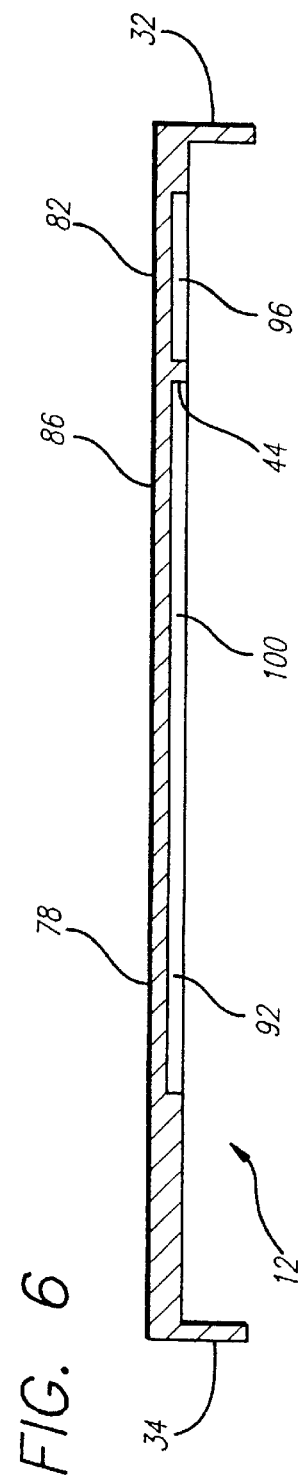
FIG. 5
FIG. 6

SUSPENSION WITH RETICULATED SPRING PORTION AND PATTERN ETCHED BEAM PORTION

REFERENCES TO RELATED APPLICATIONS

This application claims the benefit of United States Provisional Application Ser. No. 60/075,950, filed Feb. 25, 1998.

BACKGROUND OF THE INVENTION

1. Technical Field

This invention relates to disk drive suspensions, and more particularly to disk drive suspensions having high non-operating shock properties and increased sway mode resonance characteristics.

2. Related Art

Disk drive suspensions typically have a base portion, a spring portion and an elongated beam portion adapted to support a flexure and slider adjacent a disk surface. The basis shape and function of disk drive suspensions continue to be challenged by ever-decreasing size requirements and the need to maintain or improve the operation of the suspensions even as they grow smaller, from standard, to nano, and more recently to be suitable for the so-called pico-size sliders for example which are only 30% of the formerly standard size slider. Suspensions optimized for use with nano-sized sliders have found widespread use in desktop applications where low cost and reliability in a stationary environment have been paramount considerations. Mobile applications such as laptop computers require typically a higher non-operating shock characteristic, to withstand environmental events such as drops and bangs. High non-operating shock can be achieved by reducing the mass of the suspension but reductions in mass likely will adversely affect other critical properties such as vertical stiffness and resonance which is related to stiffness and mass of the suspension.

SUMMARY OF THE INVENTION

The major differences between pico and nano size sliders are the mass of the slider and the air bearing stiffness in vertical, pitch and roll axes. Air bearing stiffness for a pico slider is about half that of a nano size slider. All sliders are attached to a suspension to fly over the disk surface at a specific attitude or condition for a given pre-load imposed by the suspension. The dynamic performance of the slider air bearing can be impacted by the mass of the suspension attached to it, as follows: The slider along with the suspension experiences vertical motion which results in acceleration as the slider follows the waviness of the turning disk. According to Newton's second law:

$$F = m \times a,$$

Where F is dynamic force, applied by the suspension to the slider m is mass of the slider and suspension, and a is the acceleration. Hence, a lighter suspension means less mass. Such a lighter suspension will produce less dynamic force for a given acceleration. The trend to lighter suspensions thus requires changes in their design to maintain operating characteristics in the face of less mass.

Similarly, reduced size of suspensions poses problems in maintaining suitable non-operating shock characteristics. The ability of a suspension and slider to withstand non-operating shock is directly proportional to vertical pre-load a suspension applied to the slider. The greater the pre-load the better the non-operating shock characteristic. But, since the slider overall size, and thus the size of its air bearing area is smaller in a pico-size slider, this type of slider requires a smaller pre-load to fly at a specific spacing to the disk. Higher pre-loads are constrained as well by the need to avoid wearing of the medium from the slider rubbing on the disk surface. Since pre-loading is limited, a lower mass suspension is required to minimize lift-off from the disk surface at lower accelerations and lower pre-loads.

Accordingly, the established suspension parameters for nano-size sliders must be modified for smaller sliders, including lower mass. The achieving of lower mass, assuming a given length, merely by narrowing the load beam and reducing the load beam thickness creates other problems. For example, a reduction in thickness from 0.003 inch to 0.0025 inch in a traditionally formed suspension provides a 16.67% reduction in mass but decreases vertical, or bending, stiffness below unacceptable levels. Additionally, as mass and stiffness decreased, the traditional suspension resonance decreased. The resonance of a suspension is a function of stiffness and mass of the suspension. As the thickness is reduced its mass is reduced and at the same time its stiffness is decreased. A suspension is capable of resonating in three different axes, bending, torsion, and lateral or sway. The bending mode of vibrations depends on bending stiffness. To increase bending modes of vibrations, the bending stiffness can be increased and inertia reduced (inertia equals suspension mass times the distance from the suspension mount plate to the suspension center of gravity). Bending stiffness, however, cannot simply be increased without weighing other factors. By increasing bending stiffness too much gram load sensitivity is increased due to vertical translation of the suspension. This is undesirable because it makes the tolerances of the head stack assembly more critical.

Similarly, to improve torsional modes of vibrations, an increase in torsional stiffness and a reduction in inertia (mass times distance from torsional axis to the center of gravity about torsional axis or long axis of the suspension) are required. But torsional stiffness and bending stiffness are coupled together because both derive from the same spring portion of the load beam. In order to reduce torsional inertia, mass needs to be reduced as well as the distance from torsional axis to center of gravity. This can be achieved by reducing the width of the suspension, but reducing the suspension width decreases lateral bending or sway mode resonance. Also the narrowing and other reductions in mass makes difficult the obtaining of desirable vertical stiffness, that is decreased vertical stiffness such as is desirable in pico-sized slider suspensions.

It is, accordingly, an object of the present invention provide a suspension which is reduced in mass but which has improved resonance, particularly in the sway mode and which affords decreased vertical stiffness and optimum gram loading. It is a further object of the invention to provide a suspension having a modified shape and configuration to be narrower, less stiff in the vertical direction and more rigid in the torsional mode, and withal smaller and with less mass. It is a further object to provide a suspension load beam having a reticulated spring portion between the base portion and the beam portion, such that the suspension load beam is lighter and because of the rectilinear perforations stiffer in sway mode but less stiff in the bending mode, and thus exerts a gram force on the slider suitable for a disk drive suspension, particularly for a smaller slider such as the pico-size slider without a concomitant sacrifice in sway mode properties. It is a further object to etch an alternating pattern of slots and ribs, somewhat in the checkerboard fashion, to give reduced vertical stiffness while maintaining high sway mode resonance. Yet another object is to partially or completely etch through the beam portion in the area between the beam edge rails to reduce mass as much as possible without sacrificing rigidity of suitability for use as a suspension for pico-size sliders. A final object is to provide a suspension having as little as half the vertical stiffness of the prior art suspensions, and a one-third better non-operating shock characteristic.

These and other objects of the invention to appear hereinafter are realized in a disk drive suspension having high non-operating shock performance and increased sway mode resonance, the suspension comprising a load beam having a base portion, a spring portion and an elongated beam portion, the beam portion providing a mounting surface for a flexure, the spring portion connecting the base portion and the beam portion in beam portion loading relation, the spring portion being reticulated throughout substantially its entire extent in a manner to decrease the vertical stiffness of the suspension while increasing its sway mode resonance characteristic.

In this and like embodiments, typically, the beam portion has left and right edge rails and is selectively reduced in thickness between the rails, the beam portion defines a series of polygonal figures of reduced thickness, the beam portion has ribs defined between the reduced thickness polygonal figures, and the ribs are radially disposed and emanate from the middle of the beam portion.

Alternatively, the beam portion has left and right edge rails and is selectively apertured between the rails, the beam portion defines a series of polygonal apertures, the beam portion has ribs defined between the polygonal apertures, and the ribs are radially disposed and emanate from the middle of the beam portion.

In a further embodiment of the invention, there is provided a disk drive suspension having high non-operating shock performance and increased sway mode resonance, the suspension comprising a unitary load beam having a base portion, a spring portion and an elongated beam portion, the beam portion mounting a flexure, the spring portion connecting the base portion and the beam portion in beam portion loading relation, the spring portion being reticulated throughout substantially its entire extent in a manner to decrease the vertical stiffness of the suspension while increasing its sway mode resonance characteristic.

In this and like embodiments, typically, the base portion is generally rectangular, the spring portion is generally trapezoidal, and the beam portion is generally triangular and of greater width at its widest point than the base, the spring portion defines a series of elongated openings arranged in columns and rows across substantially its entire lateral and longitudinal extent, the elongated openings are of a width and height to be disposed in four columns of at least six openings arranged in parallel with the longitudinal axis of the spring portion, and the beam portion is a previously described.

BRIEF DESCRIPTION OF THE DRAWINGS

The invention will be further described as to an illustrative embodiment in conjunction with the attached drawings in which:

FIG. 2 is a plan view thereof;

FIG. 3 is a view taken on line 3—3 in FIG. 2;

FIG. 4A is a view like FIG. 1 of a second embodiment of the invention;

FIG. 4B is a fragmentary view of the invention shown in FIG. 4A inverted;

FIG. 5 is a plan view thereof; and,

FIG. 6 is a view taken on line 6—6 in FIG. 5

DETAILED DESCRIPTION

Figure 1:
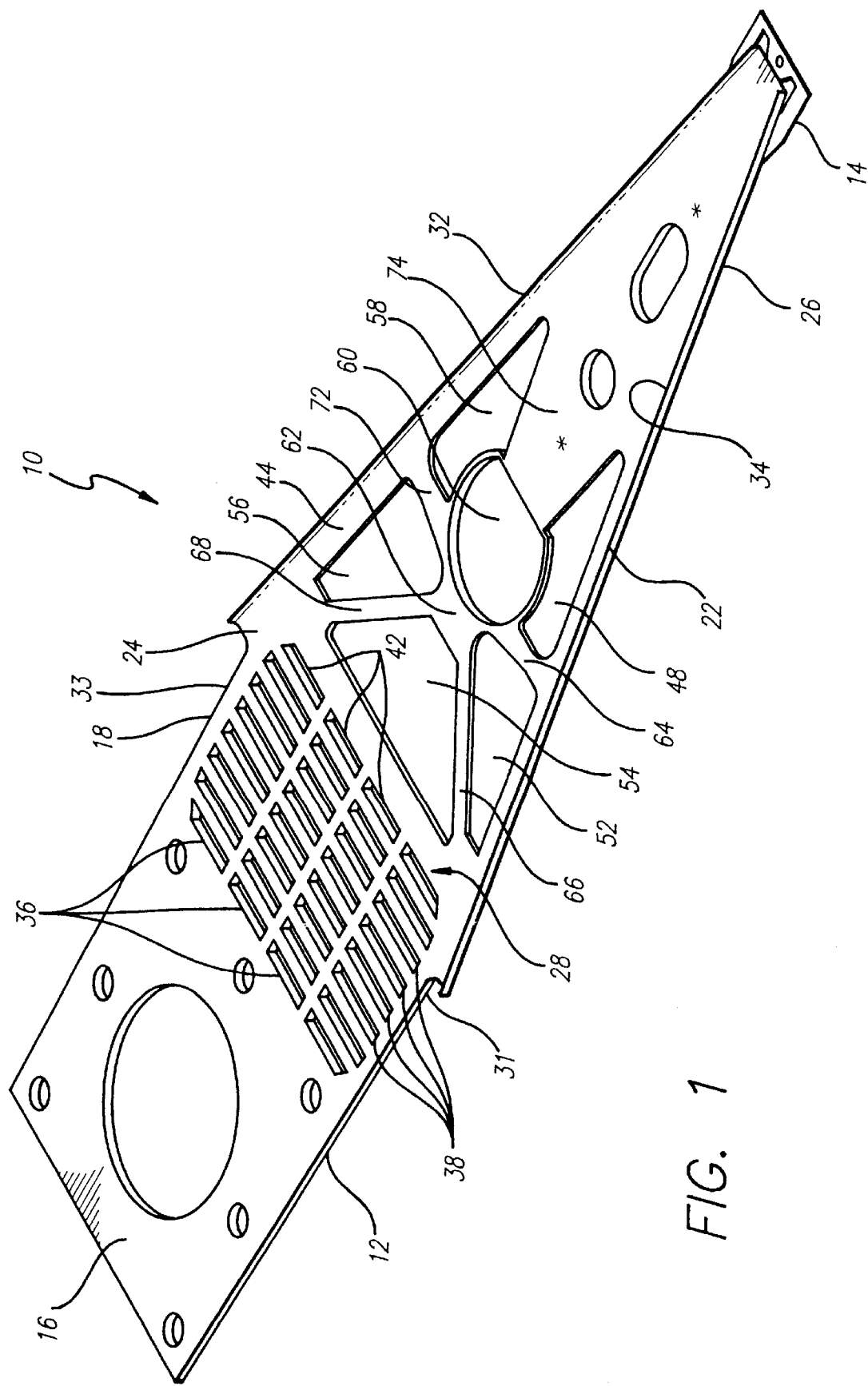
FIG. 1 is an axonometric view of the present suspension in one embodiment.

The present invention meets the foregoing objectives as the following comparison of the invention suspension with alternative designs, including Design A, a narrower style without the invention reticulation feature, and Design B a prior art suspension known for use in nano-sized suspensions. Invention 1 and Invention 2 differ slightly in dimensions and properties but share the invention features described herein.

TABLE

| DESIGN PARAMETERS | DESIGN A | DESIGN B | INVENTION 1 | INVENTION 2 |
| --- | --- | --- | --- | --- |
| RESONANCE: | | | | |
| First Torsion, kHz | 2.9 | 2.7 | 2.7 | 2.7 |
| Second Torsion, kHz | 7.9 | 7.4 | 7.7 | 7.7 |
| Sway Mode, kHz | 7.2 | 10.6 | 12 | 12 |
| SHOCK: | | | | |
| Mass, mg | 28 | 46 | 35 | 35 |
| Non-Operating g per gram | 92 | 39 | 64 | 64 |
| OTHER: | | | | |
| Vertical stiffness, N/m, calc | 12.2 | 26.0 | 13.8 | 13.8 |
| Pitch stiffness, micro N-m/deg, calc | 1.86 | 3.24 | 1.40 | 1.86 |
| Roll stiffness, micro N-m/deg, calc | 1.76 | 2.43 | 1.32 | 1.76 |
| Lateral stiffness, N/mm, calc | 10.60 | 10.30 | 9.26 | 10.60 |
| Load beam Material thickness, inches | 0.0025 | 0.0030 | 0.0025 | 0.0025 |
| Flexure Material thickness, inches | 0.0011 | 0.0012 | 0.0010 | 0.0011 |
| Length, mm | 18 | 18 | 18 | 18 |
| Baseplate size, inches | 0.200 sq | 0.200 sq | 0.200 sq | 0.200 sq |
| Rail height, inches | 0.010 | 0.014 | 0.014 | 0.014 | portion loading relation, the spring portion being reticulated throughout substantially its entire extent in a manner to decrease the vertical stiffness of the suspension while increasing its sway mode resonance characteristic.

With reference now to the drawings, in FIGS. 1–3 a disk drive suspension is shown at 10 and comprises a load beam 12 having an affixed flexure 14. Load beam 12 has a base portion 16, a spring portion 18 and an elongated beam portion 22. Load beam base portion 16 is generally rectangular, the spring portion 18 is generally trapezoidal, and the beam portion 22 is generally triangular and of greater width at its widest point 24 than is the base portion. The beam portion 22 defines a flexure mounting surface 26 to which the flexure 14 is affixed, typically by welding.

Load beam spring portion 18 is reticulated at area 28 extending throughout substantially its entire extent between base portion 16 and beam portion 22 on the longitudinal axis and from left edge 31 to right edge 33 on the transverse axis. Reticulation area 28 comprises columns 36 and rows 38 of rectangular apertures 42. The number of columns 36 and rows 42 is not narrowly critical providing the intended reduction in vertical stiffness is realized, as above described and an increase or at least lack of decrease in sway mode resonance also realized. The reticulation pattern shown in area 28 comprising four columns left to right and 8 rows in those columns is a typical pattern, but more or fewer columns and more or fewer rows can be used. The specific rectangular shape of the apertures 42 is also not critical, the need being to fill the area 28 with sufficient voids (areas within the apertures, to reduce weight but sufficient non-voids or ribs (areas between voids) to maintain strength in the spring area for imposing the desired gram load, see the Table above, for example. Also, the pattern in area 28 should provide a beam effect against sway movement, and keep the sway resonance characteristic high. The illustrated pattern in area 28 does this and thus benchmarks other designs that can be used including circular or other curvilinear voids, out of plane ribbing, and the like, in appropriate patterns to achieve the weight reduction while stiffening the spring portion 18 against decreased sway resonance properties.

Load beam elongated beam portion 22 is also suitably reduced in weight, by removal of sections of the beam portion wall 44 at various locations, generally between right and left edge rails 32, 34. Thus beam portion 22 is suitably etched or otherwise formed to remove the entire depth of wall 44 to form aperture locations 48, 52, 54, 56, 58 and 60 generally in a pattern formed about the approximate center 62 of the beam portion and occupying substantially all of the area between the edge rails 32, 34. The etching of the recesses 48, 52, 54, 56, 58 and 60 in the illustrated polygonal shape (one of various different shapes that can be used) defines a series of ribs 64, 66, 68, 72 and 74 as shown which radiate from the beam portion center 62 as shown and serve to stiffen the beam portion 22 as aperture locations 48–60 reduce the beam portion weight. This form of the invention may be lighter than the following form of FIGS. 4A, 4B–6, or weight can be kept the same while increasing the mass or number of the ribs in such manner as will meet the objectives of the invention.

In FIGS. 4A, 4B–6, wherein like numerals denote like parts, the etching of the load beam 22 is carried out to remove from 30% to 50% of the depth of wall 44 to form recesses 88, 92, 94, 96, 98 and 100 in lieu of aperture locations 48–60. Ribs 102, 104, 106, 108, and 110 formed by the etching are joined to each other by webs 76, 78, 80, 82, 84, and 86 within each respective recess, and are not free standing between their ends as in the FIGS. 1–3 embodiment. In addition, the number of apertures 42 is reduced to only eight in reticulation area 28, comprising two columns 36 of four rows 38.

The invention thus provides a suspension which is reduced in mass but which has improved resonance, particularly in the sway mode and which affords decreased vertical stiffness and optimum gram loading. The suspension has a modified shape and configuration to be narrower, less stiff in the vertical direction and more rigid in the torsional mode, and withal smaller and with less mass. The suspension has a reticulated spring portion between the base portion and the beam portion, such that the suspension load beam is lighter and because of the rectilinear perforations stiffer in sway mode but less stiff in the bending mode, and thus exerts a gram force on the slider suitable for a disk drive suspension, particularly for a smaller slider such as the pico-size slider without a concomitant sacrifice in sway mode properties. In accordance with the invention an alternating pattern of slots and ribs is etched into the spring portion of the load beam either partially or completely in the beam portion area between the beam edge rails to reduce mass as much as possible without sacrificing rigidity or suitability for use as a suspension for pico-size sliders. The invention thus provides a suspension having as little as half the vertical stiffness of the prior art suspensions, and a one-third better non-operating shock characteristic. The foregoing objects are thus met.

We claim:

1. Disk drive suspension having high non-operating shock performance and increased sway mode resonance, said suspension comprising a load beam having a base portion, a spring portion and an elongated beam portion, said beam portion providing a mounting surface for a flexure, said spring portion connecting said base portion and said beam portion in beam portion loading relation, said spring portion being reticulated with a series of elongated openings arranged in columns parallel to the longitudinal axis of said load beam and rows normal to said longitudinal axis throughout substantially its entire lateral and longitudinal extent in suspension vertical stiffness decreasing relation while increasing the sway mode resonance characteristic of said suspension.

2. Disk drive suspension according to claim 1, in which said beam portion has left and right edge rails and is selectively reduced in thickness between said rails.

3. Disk drive suspension according to claim 2, in which said beam portion defines a series of polygonal figures of reduced thickness.

4. Disk drive suspension according to claim 3, in which said beam portion has ribs defined within the beam portion plane and between said reduced thickness polygonal figures.

5. Disk drive suspension according to claim 4 in which said ribs are radially disposed and emanate from the middle of said beam portion.

6. Disk drive suspension according to claim 1, in which said beam portion has left and right edge rails and is selectively apertured between said rails.

7. Disk drive suspension according to claim 6, in which said beam portion defines a series of polygonal apertures.

8. Disk drive suspension according to claim 7, in which said beam portion has ribs defined between said polygonal apertures.

9. Disk drive suspension according to claim 8 in which said ribs are radially disposed and emanate from the middle of said beam portion.

10. Disk drive suspension having high non-operating shock performance and increased sway mode resonance, said suspension comprising a unitary load beam having a base portion, a spring portion and an elongated beam portion, said beam portion mounting a flexure, said spring portion comprising a single undivided web connecting said base portion and said beam portion in beam portion loading relation, said spring portion being reticulated throughout substantially its entire lateral and longitudinal extent with a series of elongated, rectangular openings arranged in parallel columns parallel to the longitudinal axis of said load beam and parallel rows normal to said columns and to the longitudinal axis of said load beam, said spring portion being otherwise free of openings between said columns and rows in suspension vertical stiffness decreasing relation while increasing the sway mode resonance characteristic of said suspension.

11. Disk drive suspension according to claim 10, in which said base portion is generally rectangular, said spring portion web is generally trapezoidal, and said beam portion is generally triangular and of greater width at its widest point than said base portion.

12. Disk drive suspension according to claim 10 in which said elongated openings are of a width and height to be disposed in four columns of at least six openings arranged in parallel with the longitudinal axis of said spring portion.

13. Disk drive suspension according to claim 10, in which said beam portion has left and right edge rails and is selectively apertured between said rails.

14. Disk drive suspension according to claim 13, in which said beam portion defines a series of polygonal apertures.

15. Disk drive suspension according to claim 14, in which said beam portion has ribs defined between said polygonal apertures.

16. Disk drive suspension according to claim 15, in which said ribs are radially disposed and emanate from the middle of said beam portion.

* * * * *

UNITED STATES PATENT AND TRADEMARK OFFICE
CERTIFICATE OF CORRECTION

PATENT NO.    : 6,141,187
DATED         : October 31, 2000
INVENTOR(S)   : Chu Wong and Amanullah Khan It is certified that error appears in the above-identified patent and that said Letters Patent is hereby corrected as shown below:

Column 1,
Line 7, "Manecomp Corp." should read -- Magnecomp Corp. --.

Signed and Sealed this

Second Day of October, 2001

Attest:

NICHOLAS P. GODICI
Attesting Officer    Acting Director of the United States Patent and Trademark Office